United States Patent
Ahmed et al.

(10) Patent No.: US 12,405,950 B2
(45) Date of Patent: Sep. 2, 2025

(54) DATA QUERY METHOD AND APPARATUS FOR ADJUSTING DATA LOADING TO REDUCE QUERY LATENCY

(71) Applicant: Huawei Cloud Computing Technologies Co., Ltd., Guizhou (CN)

(72) Inventors: Khalid Ahmed, Markham (CA); Yuen Chau Pang, Toronto (CA); Lei Guo, Markham (CA)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/480,348

(22) Filed: Oct. 3, 2023

(65) Prior Publication Data

US 2025/0110956 A1  Apr. 3, 2025

(51) Int. Cl.
*G06F 16/2453* (2019.01)
*G06F 11/34* (2006.01)
(Continued)

(52) U.S. Cl.
CPC .... *G06F 16/24539* (2019.01); *G06F 11/3419* (2013.01); *G06F 16/24552* (2019.01); *G06F 16/252* (2019.01)

(58) Field of Classification Search
CPC ............. G06F 16/24539; G06F 16/252; G06F 11/3419
See application file for complete search history.

(56) References Cited

U.S. PATENT DOCUMENTS

2010/0030896 A1* 2/2010 Chandramouli .. G06F 16/24568
709/224
2018/0357304 A1* 12/2018 Balasubrahmanian ......................
G06F 16/252
(Continued)

FOREIGN PATENT DOCUMENTS

CN          116136879 A        5/2023

OTHER PUBLICATIONS

Data Integration Market by Component, Services, Deployment Mode (Cloud, On-premises), Organization Size (Large enterprises, SMEs), IndustryVertical, Business Application, and Region—Global Forecast to 2026, https://www.marketsandmarkets.com/Market-Reports/data-integration-market-61793560.html, dated Nov. 12, 2024, total 11 pages.
(Continued)

Primary Examiner — Courtney Harmon
(74) Attorney, Agent, or Firm — Slater Matsil, LLP

(57) ABSTRACT

A data query method is provided. The data query method includes: receiving from a client a first query request including a first data identifier; sending back first data indicated by the first data identifier to the client; determining a retrieving strategy based on a query time cost of the first data, a loading time cost of the first data, a data freshness target, and a query latency target, retrieving second data and a data relationship that are associated with the first data according to the retrieving strategy from a data destination, wherein the second data and the data relationship meet the data freshness target, and the data relationship includes a relationship between the second data and the first data; receiving from the client a second query request including a second data identifier; sending back the second data indicated by the second data identifier to the client.

20 Claims, 9 Drawing Sheets

(51) Int. Cl.
     *G06F 16/2455*    (2019.01)
     *G06F 16/25*      (2019.01)

(56) References Cited

U.S. PATENT DOCUMENTS

2022/0075782 A1* 3/2022 Hines .................... G06F 16/211
2024/0111766 A1* 4/2024 Newman ............. G06F 16/9024

OTHER PUBLICATIONS

Global Observability Platform Market is Projected to Progress from a Worth of US$ 2.17 Bn in 2022 to a Healthy Revenue of US$5.55 Bn at a CAGR of 8.2% by year2032-end | Future Market Insights,Inc., https://www.globenewswire.com/news-release/2022/12/29/2580569/0/en/Global-Observability-Platform-Market-is-Projected-to-Progress-from-a-Worth-of-US-2-17-Bn-in-2022-to-a-Healthy-Revenue-of-US-5-55-Bn-at-a-CAGR-of-8-2-by-year-2032-end-Future-Market-.html, Dec. 29, 2022, total 7 pages.
Cloud Monitoring Market, https://www.nextmsc.com/report/cloud-monitoring-market, Nov. 12, 2024, total 10 pages.

* cited by examiner

DATA QUERY METHOD AND APPARATUS FOR ADJUSTING DATA LOADING TO REDUCE QUERY LATENCY

TECHNICAL FIELD

The present disclosure relates to the field of computers, and more particularly, to a data query method for adjusting data loading to reduce query latency, a computer device, a non-transitory computer-readable storage medium, and a communication system.

BACKGROUND

Currently, data from multiple data sources are generally subjected to Extract, Transform & Load (ETL) processes, and the obtained processed data is stored in a data destination to serve as fundamental data for subsequent data mining and data analysis. For example, the data from multiple data sources is processed through high-performance ETL frameworks. However, if the target data is absent in the data destination, clients may encounter difficulties retrieving it, potentially leading to query failures. On the other hand, real-time online loading of target data from the data source to the data destination can cause notable query latency.

SUMMARY

Embodiments of the present disclosure provide a data query method and related apparatus, to help reduce query latency and improve query efficiency.

According to a first aspect, a data query method is provided. The method includes: determining a retrieving strategy based on a query time cost of first data, a loading time cost of the first data, a data freshness target, and a query latency target before, after, or at the same time as sending back the first data to a client according to a first query request, the first query request is received from the client; retrieving second data and a data relationship that are associated with the first data according to the retrieving strategy from a data destination. The second data and the data relationship meet the data freshness target, and the data relationship includes a relationship between the second data and the first data. In turn, the second data which is loaded in advance is sent back after receiving a second query request.

In some embodiments of the present disclosure, loading is adjusted based on the analysis of queries. For example, by analyzing parameters associated with previously queried data and loading data that is associated with previously queried data to the data destination in advance, the associated data may be retrieved quickly when another query request is received. In a solution where query and loading are not related, arbitrary data is loaded to the data destination. As a result, the data to be queried may not be stored in the data destination and may need to be loaded from the data source. Compared to the solution where query and loading are not related, the solution provided in some embodiments of the present disclosure meets the data freshness target and query latency target, thereby reducing query latency and improving query efficiency.

In a possible implementation, retrieving the second data and the data relationship that are associated with the first data according to the retrieving strategy from the data destination includes: returning the second data and the data relationship from the data destination, in a case where the data destination contains the second data and the data relationship.

Since the data destination contains the second data and the data relationship, the second data may be retrieved as quickly as possible.

For example, returning the second data and the data relationship from the data destination in a case where the data destination contains the second data and the data relationship includes: in a case where the second data and the data relationship contained in the data destination meet data source freshness, returning the second data and the data relationship that meet the data source freshness from the data destination.

For another example, returning the second data and the data relationship from the data destination in a case where the data destination contains the second data and the data relationship includes: in a case where the second data and the data relationship contained in the data destination fail to meet data source freshness, loading the second data and the data relationship that meet the data source freshness from the data source to the data destination; returning the second data and the data relationship that meet the data source freshness from the data destination.

In another possible implementation, retrieving the second data and the data relationship that are associated with the first data according to the retrieving strategy from the data destination includes: loading the second data and the data relationship from a data source to the data destination and returning the second data and the data relationship from the data destination, in a case where the data destination fails to contain the second data and the data relationship.

In a case where the data destination fails to contain the second data and the data relationship, after the second data and the data relationship are loaded from a data source to the data destination, the second data may be retrieved as quickly as possible.

In another possible implementation, the data query method further includes updating a query history in a case where the query history fails to include the second data and the data relationship, and the updated query history includes the second data and the data relationship.

In another possible implementation, the data query method further includes updating a first data query timestamp and a second data query timestamp in the query history. In the updated query history, the first data query timestamp is the time when the first data is retrieved from the data destination, and the second data query timestamp is NULL.

Thus, by updating the query history, recording the data that has been queried and the data associated with the data that has been queried, determining a retrieving strategy for the data associated with the data that has been queried according to the query results of the data that has been queried in the record, and loading the associated data according to the retrieving strategy, so that the data that may be queried in the near future (i.e., the associated data) is stored in the data destination, the required data may be retrieved as quickly as possible, thereby reducing query latency and improving query efficiency.

In a possible implementation, determining a retrieving strategy based on the query time cost of the first data, the loading time cost of the first data, the data freshness target, and the query latency target includes: setting a sampling interval to the data freshness target in a case where the query time cost of the first data and the loading time cost of the first data meet the query latency target. The sampling interval is a time interval of retrieving the second data and the data relationship from a data source.

The description that the query time cost of the first data and the loading time cost of the first data meet the query latency target means that the first data, which is loaded from the data source and then stored in the data destination, is fresh. Therefore, the second data may be loaded according to the current sampling interval to ensure the freshness of the second data.

In another possible implementation, determining a retrieving strategy based on the query time cost of the first data, the loading time cost of the first data, the data freshness target, and the query latency target includes: scaling a storage capacity of the data destination in a case where the query time cost of the first data fails to meet the query latency target.

Due to possible insufficient storage capacity of the data destination, the first data may not be stored in the data destination, resulting in the query time cost of the first data failing to meet the query latency target when the first data is queried. In this case, the storage capacity of the data destination may be scaled to ensure that the data that may be queried in the near future is stored in the data destination. In this way, the required data may be retrieved as quickly as possible, thereby reducing query latency and improving query efficiency.

In another possible implementation, determining a retrieving strategy based on the query time cost of the first data, the loading time cost of the first data, the data freshness target, and the query latency target includes: setting a sampling interval to a value of subtracting the query time cost of the first data from the data freshness target in a case where the query time cost of the first data fails to meet the query latency target. The sampling interval is a time interval of retrieving the second data and the data relationship from a data source.

Thus, by shortening the sampling interval, the freshness of the second data and the data relationship loaded from the data source may be ensured.

In another possible implementation, determining a retrieving strategy based on the query time cost of the first data, the loading time cost of the first data, the data freshness target, and the query latency target includes: scaling a number of loaders in a case where the query time cost of the first data and the loading time cost of the first data fail to meet the query latency target while the query time cost of the first data meets the query latency target The description that the query time cost of the first data meets the query latency target means that the first data can be retrieved as quickly as possible within a short period of time. The description that the query time cost of the first data and the loading time cost of the first data fail to meet the query latency target means that it takes a long time to load the first data from the data source. The long loading time may be caused by limited resources of the loader. Therefore, the loading time may be shortened by scaling the number of the loaders.

In some embodiments of the present disclosure, scaling the number of loaders includes deploying at least one additional loader and an original loader on a same server or across different servers.

Thus, by scaling the loader on the same server or across different servers, the flexibility of loader deployment may be improved.

In another possible implementation, determining a retrieving strategy based on the query time cost of the first data, the loading time cost of the first data, the data freshness target, and the query latency target includes: setting a sampling interval to a value of subtracting the loading time cost of the first data from the data freshness target in a case where the query time cost of the first data and the loading time cost of the first data fail to meet the query latency target while the query time cost of the first data meets the query latency target. The sampling interval is a time interval of retrieving the second data and the data relationship from a data source.

Thus, by shortening the sampling interval, the freshness of the second data and the data relationship loaded from the data source may be ensured.

In a possible implementation, the data query method further includes storing the second data and the data relationship in a cache. In this case, sending back the second data indicated by the second data to the client identifier includes: sending back the second data indicated by the second data identifier from the cache to the client.

Thus, data may be obtained from the cache, which may enable the required data to be retrieved as quickly as possible, thereby reducing query latency and improving query efficiency.

In a possible implementation, the first data and the second data are nodes in a graph structure of data, and the data relationship between the first data and the second data is an edge in the graph structure of the data.

Therefore, by storing data and data relationships in the form of a graph structure, the data associated with previously queried data may be loaded in advance, and the data that may be queried in the near future (i.e., the associated data) may be stored in the data destination in advance. Therefore, the required data may be retrieved as quickly as possible, thereby reducing query latency and improving query efficiency.

In a possible implementation, a parameter of the first data or the second data includes at least one of: first data identifier for indicating the first data; second data identifier for indicating the second data; query time cost, which is time it takes to query the first data or the second data from the data destination; loading time cost, which is time it takes to load the first data or the second data from a data source to the data destination; query timestamp, which is time that the first data or the second data is retrieved from the data destination; loading timestamp, which is time that the first data or the second data is loaded from a data source to the data destination; data source freshness, which is a time interval of updating data at a data source.

In a possible implementation, the second data includes at least one data directly or indirectly associated with the first data.

According to a second aspect, a data query apparatus is provided. The data query apparatus includes various modules for executing data query methods in the first aspect or any possible design of the first aspect. For example, the data query apparatus includes a communication module, a data analysis module, and a data retrieving module.

The communication module is configured to receive a first query request from a client, where the first query request includes a first data identifier, and send back the second data indicated by the second data identifier to the client.

The data analysis module is used to: obtain a query time cost of the first data, a loading time cost of the first data, a data freshness target, and a query latency target; and determine a retrieving strategy based on the query time cost of the first data, the loading time cost of the first data, the data freshness target, and the query latency target.

The data retrieving module is used to retrieve second data and a data relationship that are associated with the first data according to the retrieving strategy from a data destination, wherein the second data and the data relationship meet the data freshness target, and the data relationship includes a relationship between the second data and the first data.

The communication module is further configured to receive a second query request from the client, where the second query request includes a second data identifier, and send back the second data indicated by the second data identifier to the client.

According to a third aspect, a chip is provided. The chip includes a logic circuit and a power supply circuit. The power supply circuit is used to supply power to the logic circuit. The logical circuit is used to execute the steps of the data query method in the first aspect or any possible implementation of the first aspect.

According to a forth aspect, a computer device is provided. The computer device includes a memory and a processor. The storage is configured to store a set of computer instructions, and when the set of computer instructions are executed by the processor, the processor executes the steps of the data query method in the first aspect or any possible implementation of the first aspect.

According to a fifth aspect, a communication system is provided. The communication system includes a client and a multiple computer device. The client is used to send a query request to the computer device and receive a query result from the computer device. The computer device is used to execute the steps of the data query method in the first aspect or any possible implementation of the first aspect.

According to a fifth aspect, a non-transitory computer-readable storage medium is provided. The non-transitory computer-readable storage medium includes computer software instructions; when computer software instructions are run in a computer device, causing the computer device to execute the steps of the data query method in the first aspect or any possible implementation of the first aspect.

According to a seventh aspect, a computer program product stored on a non-transitory computer-readable storage medium is provided. The computer program product, when run on the computer, causes the computer to execute the steps of the data query method in the first aspect or any possible implementation of the first aspect.

The advantages brought by any design from the second to seventh aspects can be referred to the first aspect or the different designs of the first aspect, which will not be detailed here.

On the basis of the implementations provided in the above aspects, the present disclosure is able to further provide more implementations by further combination.

DETAILED DESCRIPTION

In order to facilitate a better understanding of the disclosure, a brief introduction to the main terms in the embodiments of the present disclosure is first presented.

Graph Database: An organized collection of data that uses graph structures to represent data and data relationships. In the graph database, nodes represent data, and edges represent data relationships.

Query Latency: The time between initiating a query and receiving the results, which is a query time cost.

Data Freshness: The timeliness and relevance of data. It is an important consideration in data analytics because it can affect for example the accuracy and usefulness of the insights and conclusions that are drawn from the data. Data is considered fresh if it describes the real world right now.

ETL (Extract, Transform and Load): Data integration process that combines data from multiple data sources into a single, the data after the ETL process is loaded into a data destination or other systems. The ETL may also be called ELT sometimes.

Figure 1:
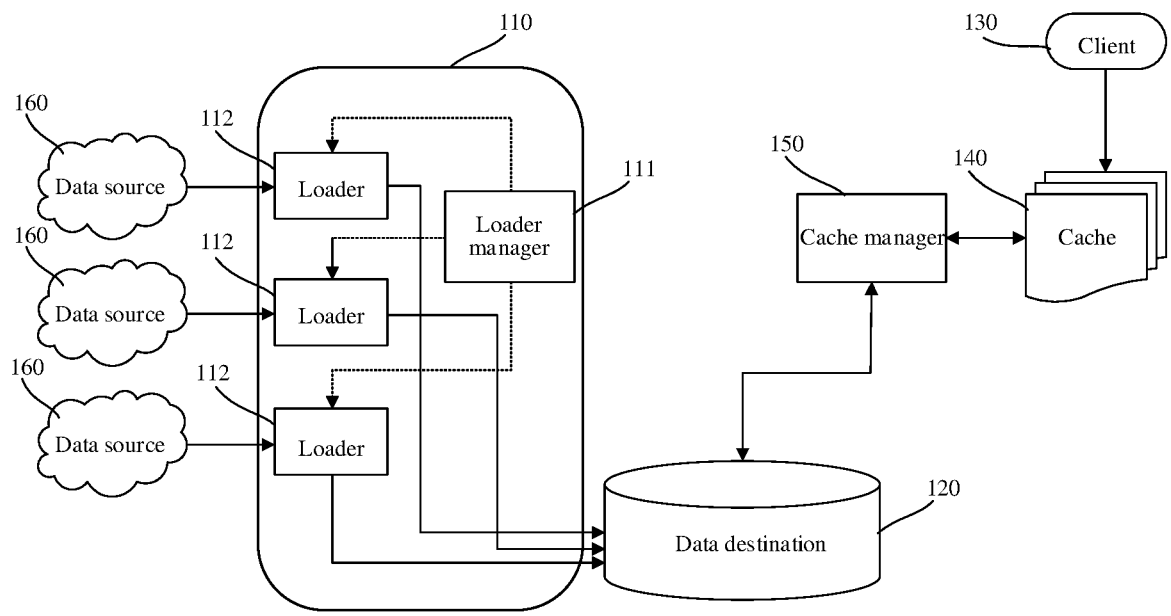
FIG. 1 is a schematic diagram illustrating an architecture of a generalized ETL and query workflow.

FIG. 1 is an exemplary schematic diagram illustrating an architecture of a generalized ETL and query workflow. As shown in FIG. 1, a server 110 deploys a loader manager 111 and a loader 112. The loader manager 111 is used to manage and supervise the loader 112. The loader 112 is responsible for extracting and transforming data from various data sources 160, and loading the data into a data destination 120, that is, the data after ETL process is persistently stored in the data destination 120.

When a user needs to query data, a query request may be sent by a client 130 to obtain the data to be queried. In a case where the cache 140 fails to contain the data to be queried, the data to be queried will be retrieved from the data destination 120, stored in the cache 140, and then sent back to the client 130. If the data destination 120 fails to store the data to be queried as well, the data to be queried will be obtained from the data source 160, stored in the data destination 120 and the cache 140, and then sent back to the client 130.

The cache manager 150 manages the cache 140 to ensure that frequently queried data is readily available in the cache 140, thereby improving data query performance.

From the architecture of the ETL and the query workflow mentioned above, it can be inferred that the followings may be problems to be solved.

Problem #1: The loader manager and the cache manager are not integrated (that is, the loader manager and the cache manager operate in siloes), and the loading process and the query process are not integrated as well, which may result in an inability for the data loaded from the data source to meet query requirements such as a query latency target and a data freshness target.

For example, data that is not needed for queries are loaded, resulting in wasted resource consumption by the loaders as well as taking up unnecessary storage capacity in the data destinations.

For another example, loading unnecessary data can take valuable resources from loaders which need to load data needed by queries, resulting in delay in loading data for those needed queries and out-of-date data returned to queries.

For another example, excessive loading of data into the data destination can negatively impact query performance.

For another example, the cache manager is not informed of when new data has arrived into the data destination, resulting in missed opportunities to refresh the cache, retrieve data from the cache in a timely manner for the client and meet the data freshness target.

Problem #2: Data, stored in the data destination, with various formats from multiple data sources results in heavy query processing load and high query latency.

For example, the data stored in the data destination is in a flat format, such as name-value pairs or JSON (JavaScript Object Notation). This kind of lack of data structure limits the ability to perform cross data relationship analysis.

For another example, workarounds that involve processing data as lists result in high computational demand, degrading overall system performance and increasing query response times.

Problem #3: Only limited loaders can be deployed on a single server, which limits the ability of scaling the loaders and results in not to meet the data freshness target.

For example, the volume of data requiring ETL can fluctuate over time. When there are few loaders deployed on a single server, the limited loaders can result in bottlenecks and delays in ETL processing, thereby failing to meet the data freshness target. When there are too many loaders deployed on a single server, these loaders may be underutilized and resources may be wasted.

In order to solve the problem of long query latency, the disclosed embodiments provide a data query method. According to the data query method, a query time cost and a loading time cost of the previously queried data are analyzed, data and data relationships associated to the previously queried data are loaded in accordance with a data freshness target and a query latency target. Then the data and the data relationships from multiple data sources are stored in a graphical structure at a data destination. In this case, loading is adjusted with queries, the data to be required can be retrieved as quickly as possible, thereby reducing query latency and improving query efficiency.

Exemplary embodiments of the data query method of the present disclosure are detailed described below with the accompanying drawings.

Figure 2:
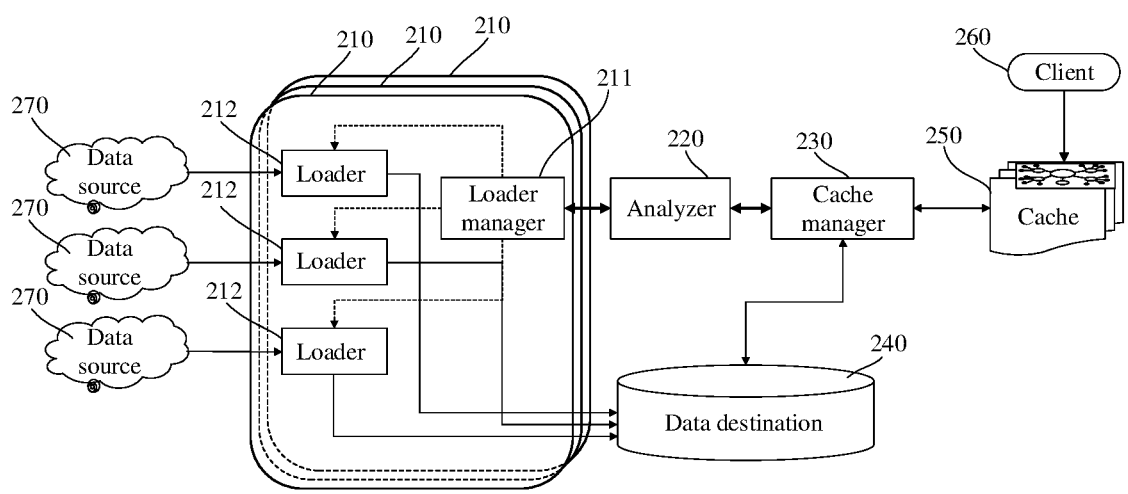
FIG. 2 is a schematic diagram illustrating an architecture of a ETL and query workflow in accordance with some embodiments of the present disclosure.

FIG. 2 is a schematic diagram of the architecture of ETL and query workflow provided by embodiments of the disclosure. Different from the architecture in FIG. 1, in FIG. 2, a loop is established between query and loading operations. The loop associates the query and the loading, so that the loading can be adjusted with the query. As shown in FIG. 2, multiple servers 210 deployed with a loader manager 211 and a loader 212 are provided. The loader manager 211 is connected to a cache manager 230 through an analyzer 220. The cache manager 230 is connected to a data destination 240.

The loader manager 211 is used to manage and supervise the loader 212. The loader 212 is used to extract data from various data sources 270, transform the data, and load the data to the data destination 240, where the data after ETL process is persistently stored.

The data destination 240 is used to store the data and the data relationship from multiple data sources 270 in a graph structure. The nodes in the graph structure represent the data, and the edges in the graph structure represent the data relationship. Thus, it enables natural support for the data relationship and operations on the data relationship. For example, potential queries in the future can be predicted according to the data relationship based on recently queried data.

The cache manager 230 is used to manage a query request and the cache 250, so as to ensure that recently queried data or data expected to be queried in the future are readily available in the cache for fast access them. For example, the cache manager 230 can consider not only temporal locality but also spatial locality when deciding which data to cache into the cache 250. Temporal locality indicates that the recently queried data is likely to be re-accessed in the near future. Spatial locality indicates that data associate to the recently queried data is likely to be accessed in the near future.

In IT cloud infrastructure there are natural relationships between infrastructures such as servers, storage volumes, security groups, and workloads like jobs, containers, serverless functions. For example, a workload unit like a container runs on a server, may access storage volumes and be protected by security groups, and communicate with other containers. As an example, if a container is being queried for, related objects nearby the container may also be queried, as well as an investigation into root cause of an outage is done.

Thus, by utilizing data relationship topology, cross data query and analysis can be achieved by the cache that is based on the graph structure of data and the cache manager that is aware of the topology, improving data query performance.

The analyzer 220 serves as a bridge between the cache manager 230 and the loader manager 211, analyzes the query time cost and the loading time cost of the previously queried data based on the query requests managed by the cache manager 230, and directs the loader manager 211 to load data and a data relationship associated to the previously queried data by considering the data freshness target and the query latency target. In addition, the analyzer 220 further gives directions on when to load these associated data and data relationship.

Thus, by controlling which data to be loaded and when to load it, the consumption of system resources (such as storage and computing resources) is minimized to the greatest extent possible, ensuring that the data to be queried meets the data freshness target and the query latency target.

In some embodiments, the analyzer 220 instructs the loader manager 211 to auto-scale the loaders within a single server or across multiple servers, by analyzing the query time cost and the loading time cost of the previously queried data based on the query requests. This enables the system to accommodate unpredictable growth in data demands and improves overall performance of the system by releasing resources when they are no longer required.

It is to be understood that, multiple loaders can be deployed across different servers, or multiple loaders can be deployed on different processors on the same server. A loader can be a software module that is run by a process or thread to realize the loader's function.

In addition, the analyzer 220 can further tell the cache manager 230 that it can evict data in the cache 250 that is not going to be queried in order to minimize the memory footprint of the cache.

In some embodiments, the analyzer 220 instructs to scale storage capacity of the data destination, by analyzing the query time cost and the loading time cost of the previously queried data based on the query requests, so that data that may be queried in the near future can be stored in the data destination. This enables the data to be queried as fast as possible, reducing query latency, and improving query efficiency.

When users need to query data, they can send a query request by a client 260 to obtain the data to be queried. In a case where the data to be queried has been cached in the cache 250, the data to be queried will be obtained from the cache 250; in a case where the data to be queried has been stored in the data destination 240 but not in the cache 250, the data to be queried will be first cached to the cache 250 from the data destination 240, and then the data to be queried will be obtained from the cache 250; in a case where the data to be queried has not been stored in the data destination 240, the data to be queried will be loaded from a data source 270 to the data destination 240, then cached to the cache 250 from data destination 240, and finally the data to be queried will be obtained from the cache 250.

The manner of connection between the loader manager 211, the analyzer 220 and the cache manager 230 in FIG. 2 is merely a schematic description. The loader manager 211, the analyzer 220, and the cache manager 230 mentioned above can be implemented by software or hardware. For example, the loader manager 211, the analyzer 220, and the cache manager 230 are integrated as functional modules on one or more physical devices. For another example, the loader manager 211, the analyzer 220, and the cache manager 230 serve as separate physical devices.

The structure of each unit shown in FIG. 2 does not constitute a limitation on the architecture of the ETL and the query workflow. In some embodiments, the architecture of the ETL and the query workflow may include more or fewer components than that shown in FIG. 2, or may combine certain components, or may be arranged with different components.

Figure 3:
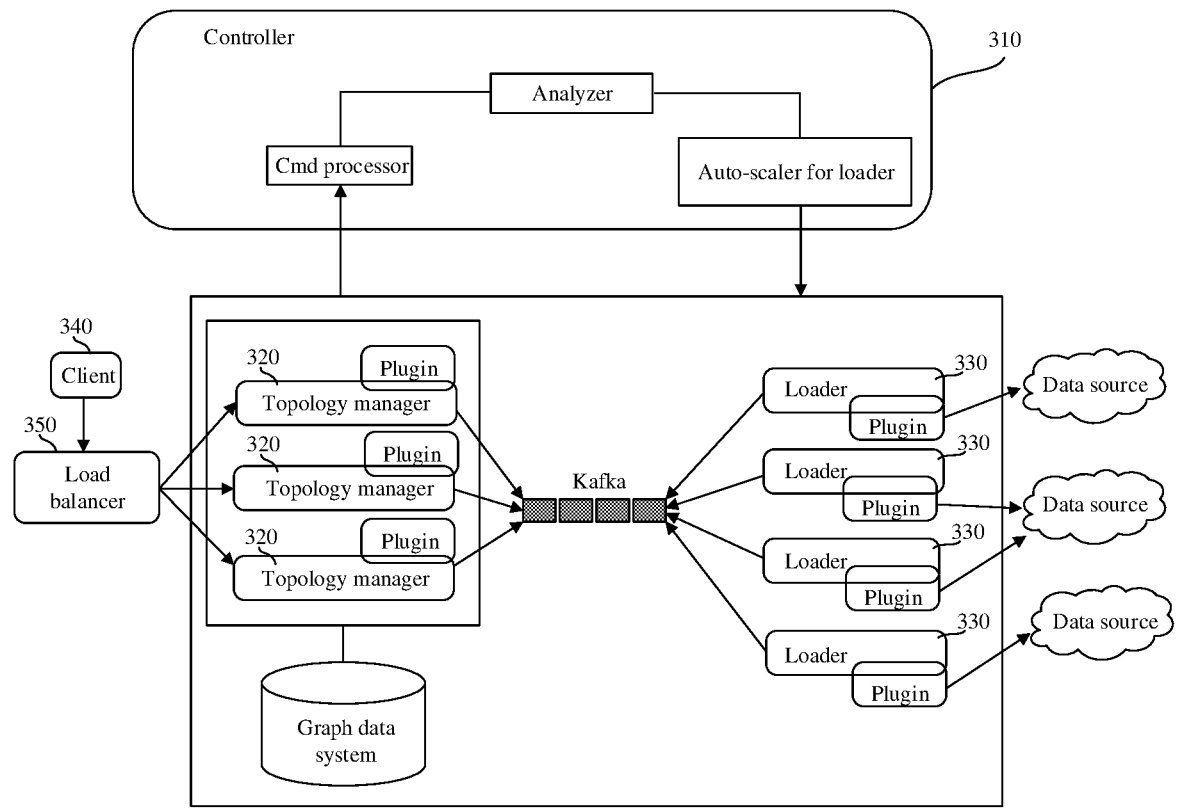
FIG. 3 is a schematic diagram illustrating an architecture of another ETL and query workflow in accordance with some embodiments of the present disclosure.

Exemplarily, FIG. 3 is a schematic diagram of an architecture of another ETL and query workflow provided by the embodiments of the disclosure. As shown in FIG. 3, a controller 310 connects a topology manager 320 and a loader 330.

The controller 310 integrates modules such as an analyzer, an auto-scaler for loader, and a Cmd processor.

The auto-scaler for loader plays a role on adjusting the data to be loaded by the loader as well as scaling the loader. On the basis of analyzing the query time cost and loading time cost of the previously queried data, the analyzer instructs the auto-scaler for loader to tell the loader to load the data and data relationships associated to the previously queried data, thereby achieving the function of adjusting the data loaded by the loader 330. On the other hand, the analyzer provides suggestions to the auto-scaler for loader to scale out or scale in the loaders.

The loader 330 is equipped with a plugin to implement the functions of the loader 330. The plugin can provide an interface to connect to the data source 270, through which data can be loaded from the data source 270. The plugin can be built-in process in the loader 330 to reduce resource consumption. Alternatively, the plugin can also be an external process that perform communication by Remote Procedure Call (RPC).

The loader 330 loads data from the data source 270, transforms the data into a form of graph structure with nodes and edges, and feeds the data into a message queue (such as Kafka message queue).

The controller 310 obtains information related to queries from the topology manager 320. The information includes the previously queried data, the query time cost and loading time cost of the previously queried data, as well as the topology of a graph data system, so as to facilitate the analyzer to perform the above operations. The graph data system is a system that includes a graph database, a graph data cache, and any other components supporting graph data storage and process.

For another example, the controller 310 further obtains the loading timestamp of data and data source freshness from the topology manager 320. The loading timestamps of data refers to the time when the data is loaded from the data source to the data destination. Data source freshness refers to the time interval of updating data at the data source.

The topology manager 320 is used to retrieve data represented in graph structure from the message queue, and store the data into the graph data system. The graph data system is not only a persistent data destination but also a cache stored data represented in graph structure.

The Topology Manager 320 can also equipped with a plugin for data transformation or data sinks, the plugin is used to analyze the data represented in graph structure and retrieved from the message queue, alter or augment the nodes and edges in the graph structure stored in the data destinations or the cache.

The client 340 runs an application and sends a query request to obtain the required data from the graph data system.

The client 340 is connected to a load balancer 350. The load balancer 350 is used to balance the allocation of query requests, so that topology manager 320 can process query requests as fast as possible and send back the data required by the client 340.

Figure 4:
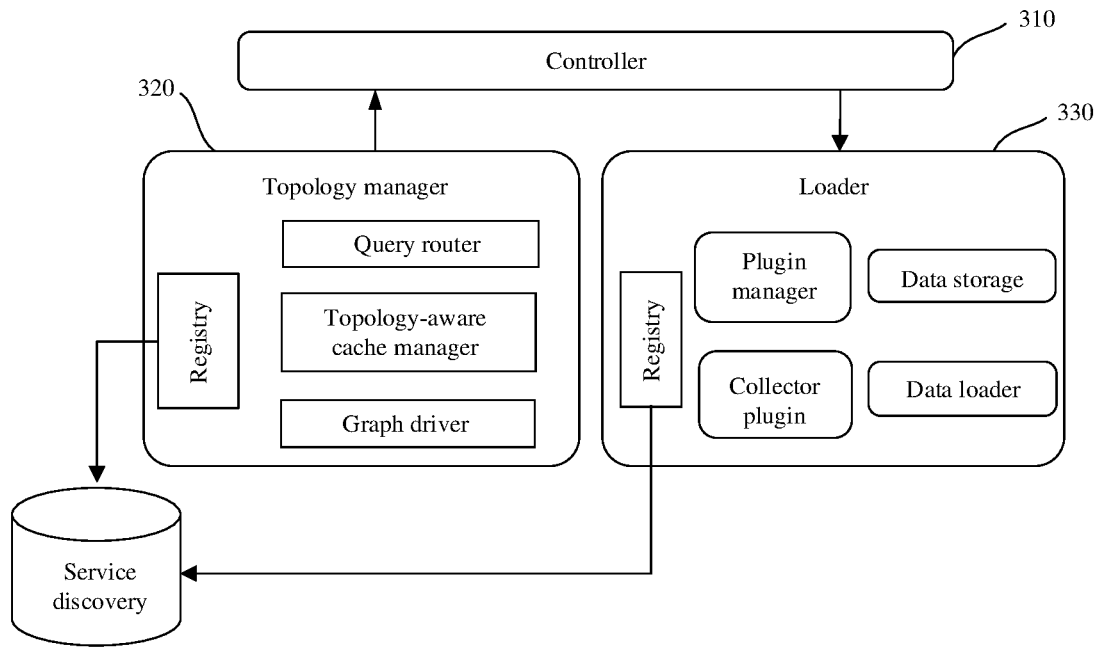
FIG. 4 is a schematic diagram illustrating an architecture of still another ETL and query in accordance with some embodiments of the present disclosure.

Exemplarily, FIG. 4 is a schematic diagram of an architecture of another ETL and query workflow provided by the embodiments of the disclosure. As shown in FIG. 4, the topology manager 320 further includes a topology-aware cache manager, a graph driver, a query router, and a registry.

The topology-aware cache manager is used to retrieve data represented in graph structure from the message queue and save the data to the graphical data system.

The graph driver is used to analyze the data represented in graph structure retrieved from the message queue, alter or augment the nodes and edges in the graph structure stored in the data destinations or the cache.

The query router is used to direct a client to query for a right instance of the topology manager 320 which contains the data in the cache. The query router is usually used in a distributed implementation where multiple topology managers hold different cache data in its topology-aware cache manager.

The registry is used to store endpoint information and metadata for various components like the topology manager, the loaders and the controller, so that they can locate each other. For example, in a distributed implementation, the registry contains the role, region, network IP address and port information for each component.

The loader 330 includes a plugin manager, a data storage, a data loader, a collector plugin, and a registry.

The plugin manager is used to delete or add a plugin.

The data storage is used to cache data loaded from the data source.

The collector plugin is used to implement an interface that gathers data from a data source via an API (application programming interface).

The registry is used to store endpoint information and metadata for various components like the topology manager, the loaders and the controller, so that they can locate each other. For example, in a distributed implementation, the registry contains the role, region, network IP address and port information for each component.

The scheme provided in this disclosure can be applied to a client-server (C/S) architecture network. The client server (C/S) architecture network includes a single server or a cluster of servers. The type and functionality of the server is not limited in the present disclosure. As an example, the types of servers include blade servers, tower servers, cabinet servers, and rack servers. As another example, the types of servers include storage servers with storage capabilities or computing servers with computing capabilities, and computing servers also have storage capabilities.

Hereinafter, processes of query and analysis will be explained in detail with reference to the accompanying drawings.

Figure 5:
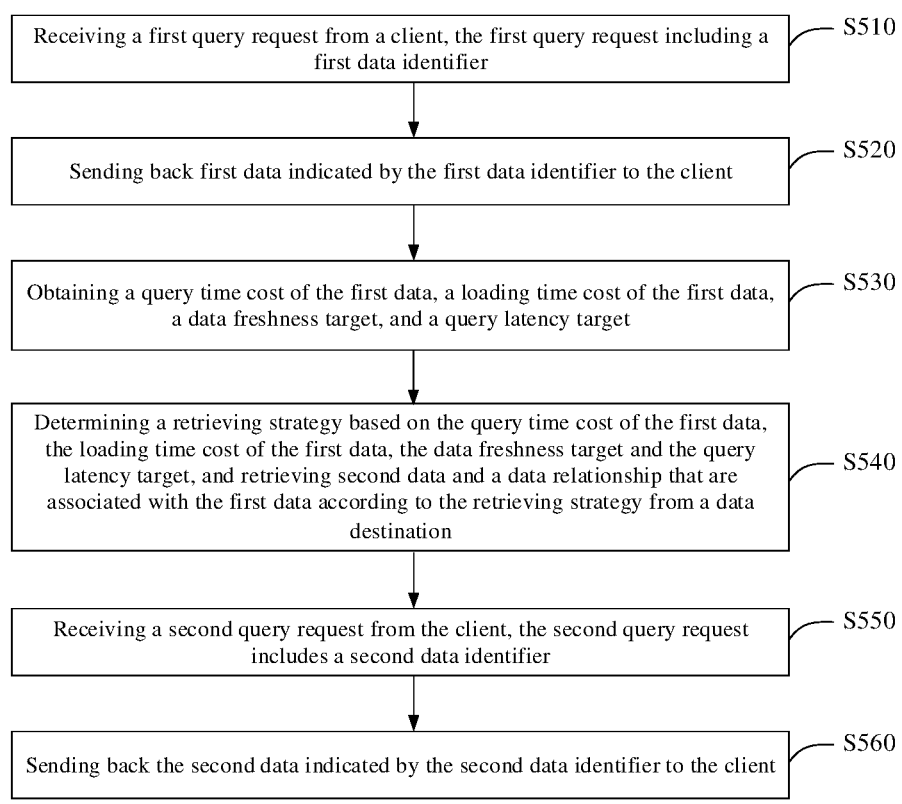
FIG. 5 is a schematic diagram illustrating a data query method in accordance with some embodiments of the present disclosure.

FIG. 5 is a schematic diagram illustrating a data query method provided by the embodiments of the disclosure. Herein, description is provided by taking querying the first data firstly and then querying the second data as an example. As shown in FIG. 5, the method includes the following steps.

In S510, a first query request is received from a client, and the first query request includes a first data identifier.

A computer device receives the first query request sent by a client, and the first query request includes the first data identifier. That is, the client requests to query the first data indicated by the first data identifier.

In S520, first data indicated by the first data identifier is sent back to the client.

In some embodiments, the computer device sends back the first data indicated by the first data identifier obtained from a cache.

In some other embodiments, if the cache fails to contain the first data, the computer device sends back the first data indicated by the first data identifier obtained from a data destination.

In some other embodiments, if the data destination fails to contain the first data, the computer device loads the first data from a data source to the data destination and sends back the first data indicated by the first data identifier obtained from the data destination.

In S530, a query time cost of the first data, a loading time cost of the first data, a data freshness target, and a query latency target are obtained.

The query time cost of the first data refers to the time it takes to query the first data from the data destination.

The loading time cost of the first data refers to the time it takes to load the first data from the data source to the data destination.

The data freshness target ensures that the first data queried by the client is the recently updated data from the data source. The data freshness target is different from data source freshness, and the data source freshness is used to indicate how often the data at the data source is updated. The data freshness target can be defined by the client or by the computer device.

The query latency target refers to the time expend by the client to query the first data. The query latency target can be defined by the client or by the computer device.

In S540, a retrieving strategy based on the query time cost of the first data, the loading time cost of the first data, the data freshness target, and the query latency target is determining, and second data and a data relationship that are associated with the first data are retrieved according to the retrieving strategy from a data destination.

After querying the first data, whether the first data meets the data freshness target and the query latency target are analyzed based on the query time cost of the first data and the loading time cost of the first data. It should be understood that, analyzing whether the first data obtained by query is new and whether it can be fast queried helps to determine whether the user's expectations for querying the first data are met.

Furthermore, the retrieving strategy is determined according to the analysis results, so as to load the second data and the data relationship associated to the first data in advance. The second data and the data relationship are able to meet the data freshness target, and the data relationship includes the relationship between the second data and the first data. Thus, by adjusting the loading with queries, it enables querying the second data as fast as possible, reducing query latency and improving query efficiency.

Schemes of adjusting the loading of data that may be queried in the near future by analyzing the already queried data will be explained in detail with reference to the following embodiments.

In S550, a second query request is received from a client, and the second query request includes a second data identifier.

The computer device receives a second query request sent by the client, and the second query request includes a second data identifier. That is, the client requests to query the second data indicated by the second data identifier.

In S560, the second data indicated by the second data identifier is sent back to the client.

In some embodiments, the computer sends back the second data indicated by the second data identifier obtained from the cache.

In some other embodiments, if the cache fails to contain the second data, the computer device sends back the second data indicated by the second data identifier obtained from the data destination.

Figure 6:
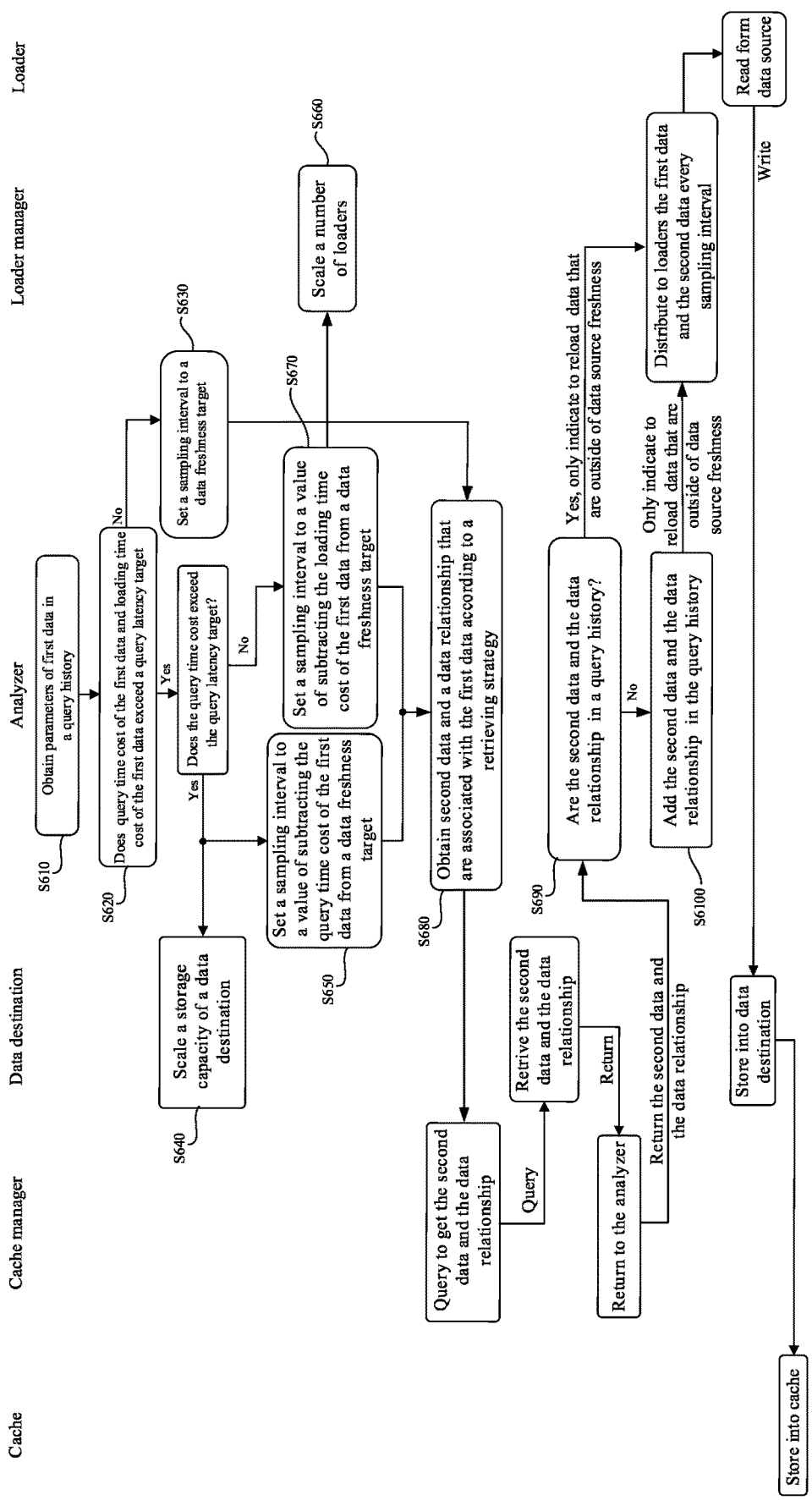
FIG. 6 is a schematic diagram illustrating another data query method in accordance with some embodiments of the present disclosure.

FIG. 6 is a schematic diagram of another data query method according to embodiments of the disclosure. Herein, the analysis of the first data that has been queried is taken as an example for explanation. As shown in FIG. 6, the method includes the following steps.

In S610, the analyzer obtains parameters of the first data in a query history.

The query history is used to indicate the data that has been queried and the data associated to the data that has been queried. For example, a first data is the data has been queried, and a second data is the data associated to the data that has been queried. The data includes parameters. The parameters include a data identifier, a query time cost, a loading time cost, a query timestamp, a loading timestamp, and data source freshness.

For example, the analyzer obtains the parameters of the first data in the query history. The parameters of the first data include a first data identifier, a query time cost of the first data, a loading time cost of the first data, a query timestamp of the first data, a loading timestamp of the first data, and data source freshness.

The first data identifier is used to indicate the first data.

The query time cost of the first data is used to indicate the time it takes to query the first data from the data destination.

The loading time cost of the first data is used to indicate the time it takes to load the first data from the data source to the data destination.

The query timestamp of the first data is used to indicate the time when the first data is retrieved from the data destination.

The loading timestamp of the first data is used to indicate the time when the first data is loaded from the data source to the data destination.

The freshness of the data source is used to indicate the time interval for updating the data at the data source.

The analyzer analyzes the parameters of the first data to determine a retrieving strategy. The retrieving strategy is used to indicate how to optimize the loading of data that may be queried in the near future (such as the loading of the second data) with historical queries (such as the query for the first data). The second data includes at least one data directly or indirectly associated to the first data. For example, the analyzer determines the retrieving strategy according to the query time cost of the first data, the loading time cost of the first data, the data freshness target, and the query latency target. The followings are steps for determining the retrieving strategy.

In some embodiments, the query history is implemented to a list, such as RECENTLY_QUERIED_LIST.

In S620, the analyzer determines whether the query time cost of the first data and the loading time cost of the first data exceed the query latency target.

In a first possible implementation, when the query time cost of the first data and the loading time cost of the first data meet the query latency target, S630 is executed.

In S630, the analyzer sets a sampling interval to the data freshness target.

The sampling interval is a time interval for obtaining the second data and the data relationship from the data source. It should be understood that, the sampling interval can refer to a time interval of loading the second data and the data relationship from the data source to the data destination. The sampling interval is used to ensure the freshness of the second data and enable the client to query fresh second data from the data destination. For example, the data freshness target is 5 minutes.

In a case where the query time cost of the first data and the loading time cost of the first data meet the query latency target, the time it takes to load the first data from the data source to the data destination and the time it takes to query the first data from the data destination meet the query latency target. The time it takes to load the first data from the data source to the data destination is relatively short, and the time it takes to query the first data from the data destination is also relatively short. In this way, the duration from loading the first data from the data source to the data destination to querying the first data is able to meet the expected time for users querying for the first data. For example, the query time cost of the first data and the loading time cost of the first data are less than or equal to the query latency target. For example, the query latency target is 10 seconds, and the query time cost of the first data and the loading time cost of the first data are less than or equal to 10 seconds.

Based on the short time it takes to load the first data from the data source to the data destination and then to query the first data, it can be expected that the time it takes to load the second data from the data source to the data destination and then to query the second data will also be short. By setting the sampling interval to the data freshness target, the freshness of the second data can be ensured, thereby enabling the client to query the fresh second data from the data destination.

In some embodiments, the query time cost of the first data and the loading time cost of the first data meet the query latency target refers to that the sum of the query time cost of the first data and the loading time cost of the first data is less than or equal to the query latency target.

In a second possible implementation, when the query time cost of the first data fails to meet the query latency target, S640 is executed.

In S640, a storage capacity of the data destination is scaled.

In a case where the query time cost of the first data fails to meet the query latency target, the time it takes to query the first data from the data destination does not meet the query latency target. The time it takes to query the first data from the data destination is relatively long. For example, the query time cost of the first data is more than the query latency target. For example, the query latency target is 10 seconds, and the query time cost of the first data is more than 10 seconds. In this case, the sum of the query time cost of the first data and the loading time cost of the first data is inevitable more than the query latency target.

In some embodiments, a long time spent on querying the first data is due to insufficient storage capacity at the data destination. In this case, the first data may not be stored at the data destination, and must be required to be loaded from the data source in real time. As a result, the query time cost of the first data may fail to meet the query latency target. The storage capacity of the data destination can be scaled, and the second data and the data relationship associated to the first data that may be queried in the near future are able to be stored in the data destination. When the second data is queried, the second data will be retrieve from the data destination as fast as possible, reducing query latency and improving query efficiency.

In addition, when the query time cost of the first data fails to meet the query latency target, S650 is also executed.

In S650, the analyzer sets the sampling interval to a value of subtracting the query time cost of the first data from the data freshness target.

The sampling interval is the time interval for obtaining the second data and the data relationship from the data source.

Based on the long time it takes to query the first data from the data destination, the sampling interval can be shortened by subtracting the query time cost of the first data from the data freshness target. It ensures the freshness of the second data, and enables the client to query the fresh second data from the data destination.

In a third possible implementation, when the query time cost of the first data and the loading time cost of the first data fail to meet the query delay target, while the query time cost of the first data meets the query delay target, S660 is executed.

In S660, the number of loaders is scaled.

In a case where the query time cost of the first data meets the query delay target, the time it takes to query the first data from the data destination meets the query latency target. That is, the time spending on querying the first data from the data destination is relatively short, and the first data can be queried as fast as possible from the data destination. However, it is possible that the time it takes to load the first data from the data source to the data destination is relatively long, and as a result, the query time cost of the first data and the loading time cost of the first data fail to meet the query delay target.

In some embodiments, there may be no sufficient loaders to load the first data due to resource limitation on the loaders, and it has to wait for the idle loaders to load the first data, which resulting in a relatively long time for the first data to be loaded. Scaling the number of loaders is helpful for ensuring sufficient resources on loaders and shortening the loading time.

It should be noted that the loaders can be adaptively scaled according to loading demand. The loaders can be scaled across different servers, for example, a first loader is deployed on a first server and a second loader is deployed on a second server. In addition, the loaders can also be scaled on different processors within the same server.

In some embodiments, when there are too many idle loaders, that is, when there is not too much data need to load from the data source to the data destination, loaders previously deployed can be released, thereby saving system resources and reducing system energy consumption.

In some embodiments, the query time cost of the first data and the loading time cost of the first data fail to meet the query latency target refers to the sum of the query time cost of the first data and the loading time cost of the first data are more than (exceed) the query latency target.

When the query time cost of the first data and the loading time cost of the first data fail to meet the query latency target, while the query time cost of the first data meets the query delay target, S670 is also executed.

In S670, the analyzer sets the sampling interval to a value of subtracting the loading time cost of the first data from the data freshness target.

The sampling interval is the time interval for obtaining the second data and the data relationship from the data source.

Based on the long time it takes to load the first data from the data source to the data destination, the sampling interval can be shortened by subtracting the loading time cost of the first data from the data freshness target. That is, the interval of loading the second data from the data source is shortened, ensuring the freshness of the second data, and enabling the client to query fresh second data from the data destination.

In S680, the analyzer instructs the cache manager to obtain the second data and the data relationship associated to the first data from the data destination according to the retrieving strategy.

After receiving the instructions from the analyzer, the cache manager initiates a query to the data destination to obtain the second data and the data relationship. The data destination retrieves the second data and the data relationship internally after receiving the query.

According to the retrieving results, in the case where the second data and the data relationship are contained in the data destination, the cache manager obtains the second data and the data relationship from the data destination. The second data and the data relationships obtained by the cache manager meet the data freshness target, and the data relationship includes the relationship between the second data and the first data.

In some embodiments, in the case where the second data and the data relationship contained in the data destination meet the data source freshness, the cache manager directly obtains the second data and the data relationship that meet the data source freshness from the data destination.

In some embodiments, in the case where the second data and the data relationship contained in the data destination fail to meet the data source freshness, the data destination loads the second data and the data relationship that meet the data source freshness from the data source, and then the cache manager obtains the second data and the data relationship that meet the data source freshness from the data destination.

According to the retrieving results, in the case where the second data and the data relationship are not contained in the data destination, the data destination loads the second data and the data relationship that meet the data source freshness from the data source, and then the cache manager obtains the second data and the data relationship from the data destination.

In S690, the analyzer determines whether the second data and the data relationships are contained in the query history.

As mentioned above, the query history is used to indicate the data that has been queried and the data associated with the already queried data. For example, the first data is the data that has been queried, and the second data is the data associated with the already queried data. The data may further include parameters, such as a data identifier (ID), a query time cost, a loading time cost, a query timestamp, a loading timestamp, and data source freshness.

If the second data and the data relationship are not recorded in the query history, the query history is updated (S6100), and the second data and the data relationship will be recorded in the updated query history. In this way, the data recorded in the query history is the data which has already been loaded into the data destination. When a query request is initiated by the client, it enables the client to query fresh second data from the data destination, thereby reducing query latency and improving query efficiency.

If the second data and the data relationship recorded in the query history fail to meet the data source freshness, or if the second data and the data relationship stored in the data destination fail to meet the data source freshness, the analyzer instructs to load the second data and the data relationship that meet the data source freshness from the data source to the data destination. Thus, it ensures the second data stored in the data destination (data that may be queried in the near future) to meet the data source freshness, thereby insuring the second data stored in the data destination meet the data freshness target.

In some embodiments, the second data and the data relationship are obtained from the data source at the sampling interval determined via the above steps, ensuring the freshness of the second data and enabling the client to query fresh second data from the data destination.

In some embodiments, the analyzer further instructs to load the first data that meets the data source freshness from the data source to the data destination, thereby ensuring that the first data stored in the data destination (data that may be re-accessed in the near future) meets the data source freshness, and thus enabling the first data stored in the data destination to meet the data freshness target.

It should be noted that the data and the data relationship are stored in the form of graph structure in the data destination and in the cache. For example, the first data and the second data are nodes in the graph model, and the data relationship between the first data and the second data are edges in the graph model. At this point, the cache manager is a topology-aware cache manager, and the cache is a cache based on graph model.

Figure 7:
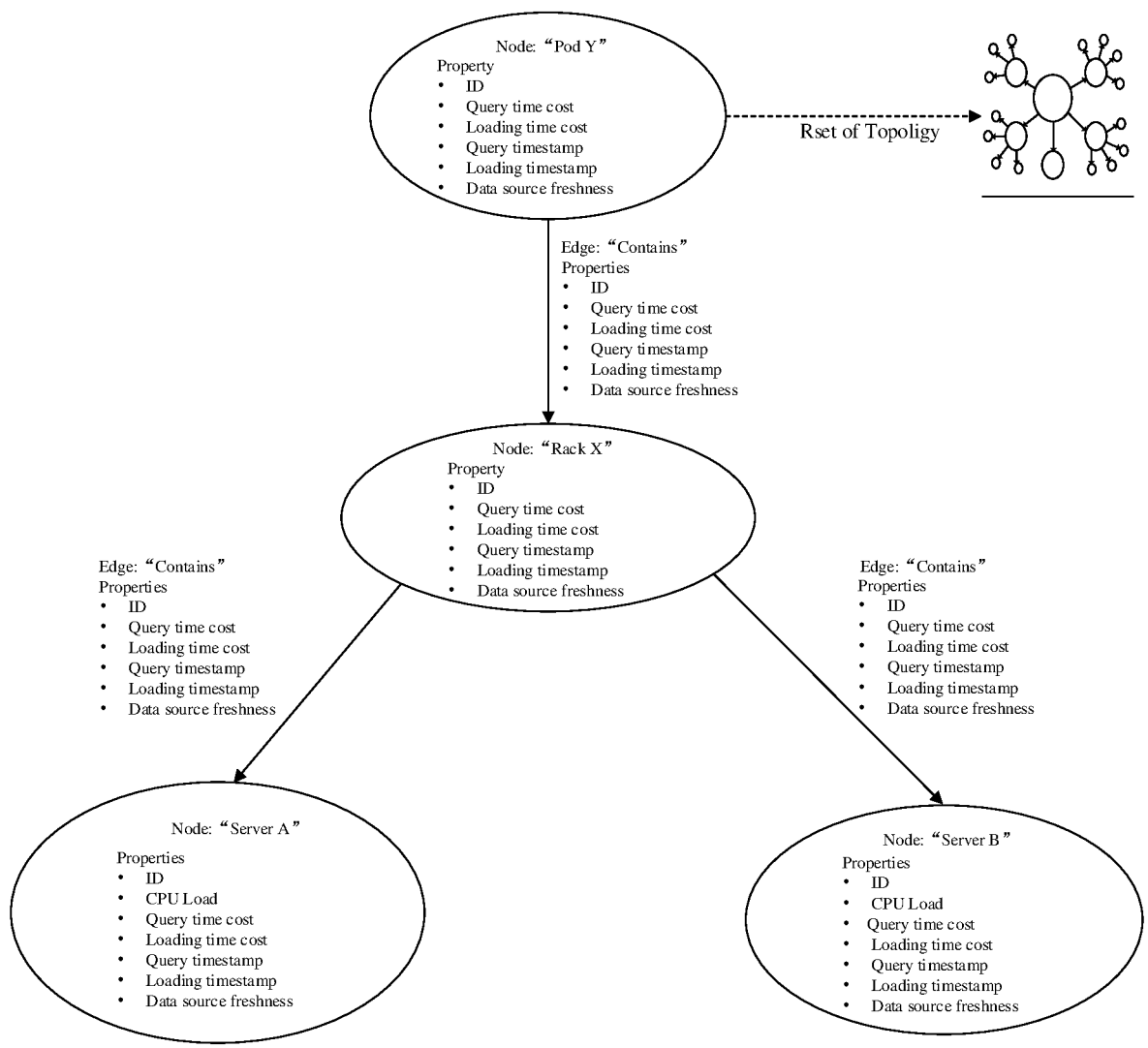
FIG. 7 is a schematic diagram illustrating a graph structure of data in accordance with some embodiments of the present disclosure.

Exemplary, FIG. 7 is a schematic diagram illustrating a graph structure of data provided by the embodiments of the disclosure. In FIG. 7, node "Pad Y" is associated to node "Rack X", and node "Rack X" is associated to node "server A" and node "server B", respectively. Nodes represent data, and edges between nodes represent data relationship. Nodes and edges may also include parameters. For example, the parameters include a data identifier (ID), a query time cost, a loading time cost, a querying timestamp, a loading timestamp, and data source freshness.

In addition, the second data includes at least one data directly or indirectly associated to the first data. For example, the directly associated data can be data that is within one hop of the current data, while the indirectly associated data can be data that is within two or more hops of the current data. The number of hops can be dynamically determined based on the query history.

For example, as shown in FIG. 7, assuming the current data is the first data, and the first data is "server A", then the second data associated to the first data includes node "Rack X", node "Pad Y", and node "server B". Node "Rack X" is the data directly associated to the first data, while node "Pad Y" and node "server B" are the data indirectly associated to the first data.

In some embodiments, the cache manager may further store the second data and the data relationship in the cache, so that when querying the second data, the second data can be fast retrieved from the cache, reducing query latency and improving query efficiency.

The data query method provided by the embodiments of the disclosure adjusts the loading according to the historical queries, and loads data that may be queried in the near future into the data destination or the cache in advance. Therefore when a data is queried, the required data can be queried as fast as possible, reducing query latency and improving query efficiency.

Figure 8:
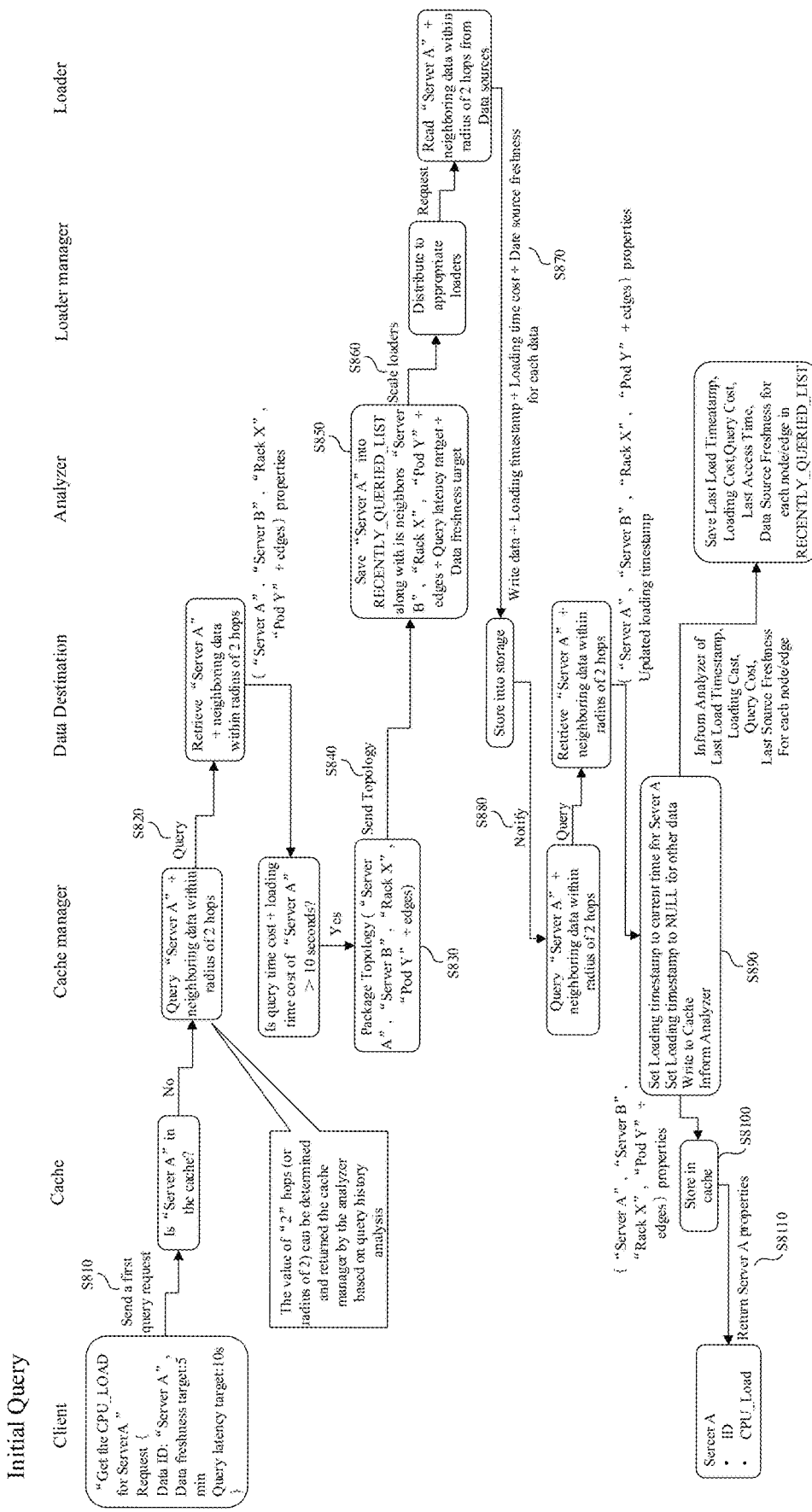
FIG. 8 is a schematic diagram illustrating an initial query in accordance with some embodiments of the present disclosure.

The following is an example of the data query process. FIG. 8 is a schematic diagram of the initial query according to some embodiments. Description is provided by taking "server A" in the graph structure shown in FIG. 7 as the data to be queried as an example.

The client sends a first query request (S810). The first query request includes a first data identifier. For example, the client requests to obtain the CPU_Load of server A, and the first data identifier is "server A". The first query request may further include a data freshness target (such as 5 minutes) and a query latency target (such as 10 seconds). It should be noted that the data freshness target and query latency target may also be excluded from the first query request.

If the cache fails to store "server A", the cache manager obtains "server A" and associated data that are within 2 hops of the "server A" from the data destination (S820). For example, "Server A", "Server B", "Rack X", "Pod Y", and the relationship between "Server A", "Server B", "Rack X", "Pod Y" are obtained by the cache manager from the data destination.

The cache manager determines that the query time cost of "Server A" and the loading time cost of "Server A" fail to meet the query latency target (S830), and sends "Server A", "Server B", "Rack X", "Pod Y" and the relationship between "Server A", "Server B", "Rack X", "Pod Y" to the analyzer (S840).

The analyzer recodes "Server A", "Server B", "Rack X", "Pod Y" and the relationship between "Server A", "Server B", "Rack X", "Pod Y" in the query history, and analyzes the first query of "Server A" (S850).

If the analyzer finds that the loading time cost of "Server A" fails to meet the query latency target, then it instructs the loader manager to scale the loaders (S860).

The loader loads "Server A" and data associated to "Server A" within 2 hops from the data source to the data destination (S870).

The data destination informs the cache manager, so that the cache manager obtains "Server A" and data associated to "Server A" within 2 hops from the data destination (S880).

The cache manager sets the query timestamp of "Server A" to current time, and the query timestamp of associated data within 2 hops to NULL (S890).

The cache manager stores "Server A" and the data associated to "Server A" within 2 hops in the cache (S8100).

The cache sends back "Server A" and CPU_LOAD to the client (S8110).

The analyzer updates the parameters of "Server A" in the query history. The parameters include a data identifier, a query time cost, a loading time cost, a query timestamp, a loading timestamp, and data source freshness. The updated query history records the updated parameters for "Server A".

Figure 9:
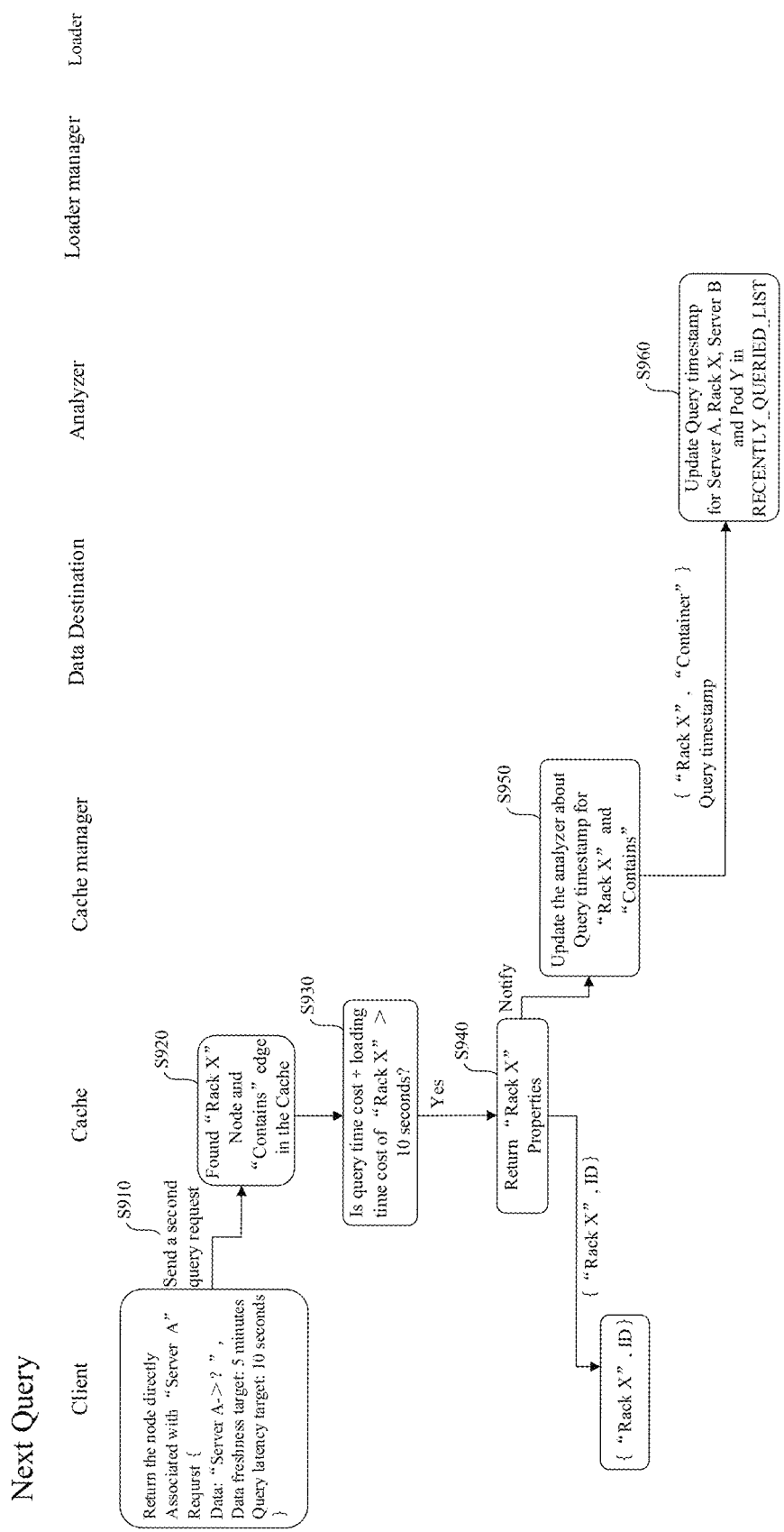
FIG. 9 is a schematic diagram illustrating a next query in accordance with some embodiments of the present disclosure.

FIG. 9 is a schematic diagram of a next query according to some embodiments. Herein, description is provided by taking querying "Rack X" in the graph structure shown in FIG. 7 as an example.

The client sends a second query request (S910). The client requests to obtain node "Rack X" which is directly associated to "server A". The second query request may also include a data freshness target (such as 5 minutes) and a query latency target (such as 10 seconds).

The cache finds node "Rack X" and relationship "Contains" in the cache (S920).

The cache determines that the query time cost and loading time cost of "Rack X" do not exceed the query latency target (S930), and returns "Rack X" to the client (S940).

The cache manager updates and sends the query timestamp of "Rack X" to the analyzer (S950).

The analyzer updates the query timestamps of nodes "Server A", "Rack X", "Server B", and "Pod Y" in the query history (such as RECENTLY_QUERIED_LIST) (S960).

Figure 10A:
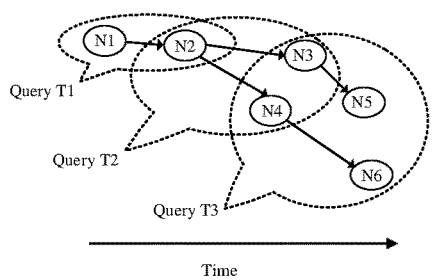
FIG. 10A to 10C are schematic diagrams illustrating the effect of a data query method in accordance with some embodiments of the present disclosure.

The data query method provided by the embodiments of the disclosure ensures the freshness of the recently queried data, and the data and the data relationship that may be queried in the near future are loaded according to the already queried data and the graph structure of the data. For example, as shown in FIG. 10A, at query T1, nodes N1 and N2 are returned. Since nodes N1 and N2 have not been queried before, N1 and N2 are loaded. At query T2, nodes N2, N3, and N4 are returned. Since nodes N3 and N4 have not been queried before, nodes N3 and N4 are loaded. Based on the data query method provided by the embodiment of the disclosure and considering the spatial locality of the data, at query T2, it was identified that there is overlap between query T1 and query T2. Based on this, it is possible that future query T3 may overlap with query T2, therefore nodes N5 and N6 are loaded into the data destination. In this way, at the query T3, there will be no additional latency when querying nodes N3, N4, N5, and N6, ensuring the freshness of the data.

Figure 10B:
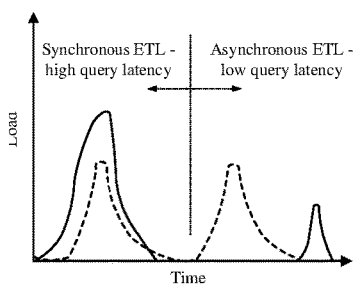

For high latency queries caused by the loading time cost of loading data from the data source to the data destination, the loader may perform asynchronous loading or scale the loader, which is exemplarily shown in FIG. 10B.

Figure 10C:
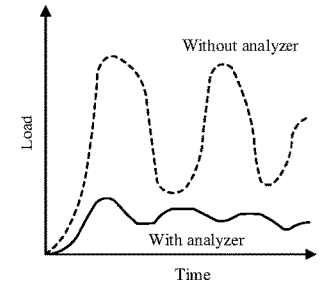

Since an analyzer is provided by the embodiments of the disclosure, extracting data from infrequently changing data sources is avoided according to the data source freshness and the loading timestamp of last loaded data, which is exemplarily shown in FIG. 10C.

It can be understood that in order to achieve the functions in the above embodiments, hardware structures and/or software modules corresponding to the execution of each function are included in the client and the computer device. Those skilled in the art should easily realize that, in combination with the units and steps described in the disclosed embodiments, the disclosed embodiments can be implemented in the form of hardware or a combination of hardware and computer software. Whether a certain function is executed in hardware or in a manner of computer software driving hardware depends on the specific application scenarios and design constraints of the technical solution.

The data query method according to the embodiments of the present disclosure is described in detail above with reference to FIGS. 2 to 10C. Next, the apparatus according to the embodiments of the present disclosure will be described with reference to FIGS. 11 to 13 below. The apparatus may be used to implement the functions of the computer device in the above method embodiments, and therefore may also achieve the beneficial effects of the above method embodiments. In this embodiment, the apparatus may be the apparatus shown in FIGS. 2 to 4, or may be a module (such as a chip) applied to the computer device.

Figure 11:
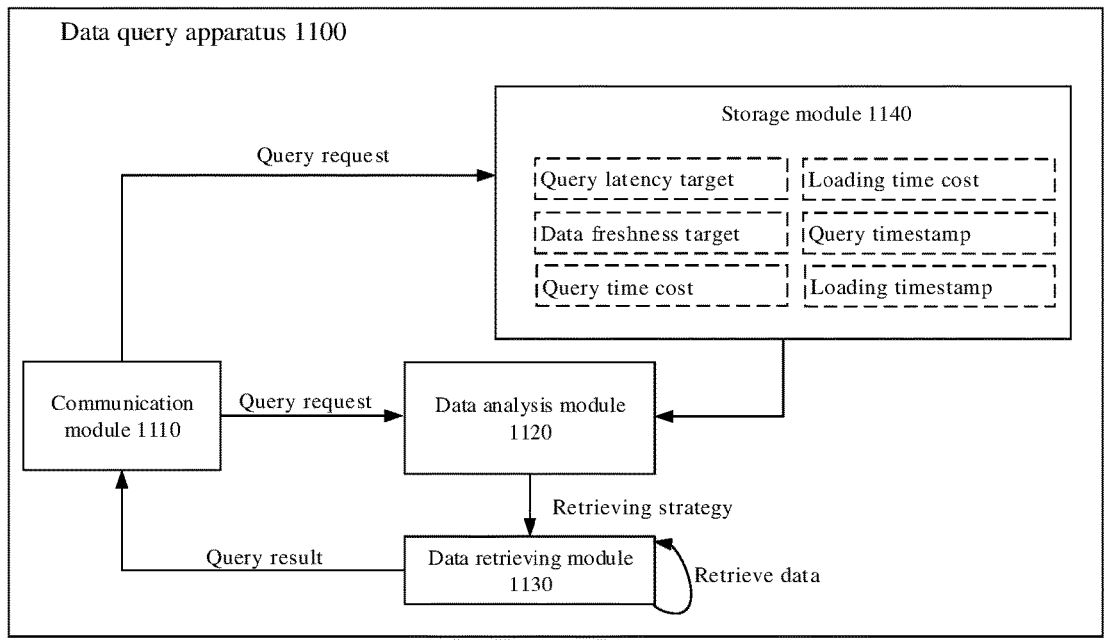
FIG. 11 is a schematic diagram illustrating a data query apparatus in accordance with some embodiments of the present disclosure.

As shown in FIG. 11, the data query apparatus 1100 includes a communication module 1110, a data analysis module 1120, a data retrieving module 1130 and a storage module 1140. The data query apparatus 1100 is used to implement the functions of the computer device in the above method embodiments shown in FIG. 5.

The communication module 1110 is configured to receive a first query request, where the first query request includes a first data identifier; and send back the first data indicated by the first data identifier.

The communication module 1110 is further configured to receive a second query request, where the second query request includes a second data identifier; and send back the second data indicated by the second data identifier.

It will be understood that the communication module 1110 receives the query request (e.g., the first query request, the second query request) and stores the query request in the storage module 1140, so that the data analysis module 1120 may analyze the queries based on the query requests and adjust the loading according to the query.

The data analysis module 1120 is used to obtain the query time cost of the first data, the loading time cost of the first data, the data freshness target, and the query latency target; and determine a retrieving strategy based on the query time cost of the first data, the loading time cost of the first data, the data freshness target, and the query latency target.

The data retrieving module 1130 is used to retrieve the second data and the data relationship associated to the first data from the data destination according to the retrieving strategy. The second data and the data relationship meet the data freshness target, and the data relationship includes the relationship between the second data and the first data.

In some embodiments, the data retrieving module 1130 is configured to directly return the second data and the data relationship from the data destination in the case where the data destination contains the second data and the data relationship, and the second data and the data relationship contained in the data destination meet the data source freshness.

In some embodiments, the data retrieving module 1130 is used to load the second data and the data relationship that meet the data source freshness from the data source to the data destination and return the second data and the data relationship that meet the data source freshness from the data destination in the case where the data destination contains the second data and the data relationship, but the second data and the data relationship contained in the data destination do not meet the data source freshness.

In some embodiments, the data retrieving module 1130 is configured to load the second data and the data relationship from the data source to the data destination and return the second data and the data relationship from the data destination in the case where the data destination does not contain the second data and data relationship.

The storage module 1140 is used to store the data freshness target, the query latency target, the query time cost, the loading time cost, the query timestamp, the loading timestamp, and the query request. The query request contains the data identifier.

It will be understood that the data query apparatus 1100 provided in the embodiments of the present disclosure may be implemented by an application-specific integrated circuit (ASIC) or a programmable logic device (PLD). The PLD may be a complex programmable logical device (CPLD), a field-programmable gate array (FPGA), a general array logic (GAL) or any combination thereof. In the case where the data query method shown in FIG. 5 is implemented through software, the data query apparatus 1100 and its respective modules may also be software modules.

The data query apparatus 1100 according to the embodiments of the present disclosure may correspond to the execution of the methods described in the embodiments of the present disclosure, and the above and other operations and/or functions of the various units in the data query apparatus 1100 are respectively used to implement corresponding processes of the respective methods in FIG. 5. For the sake of brevity, details will not be repeated here.

Figure 12:
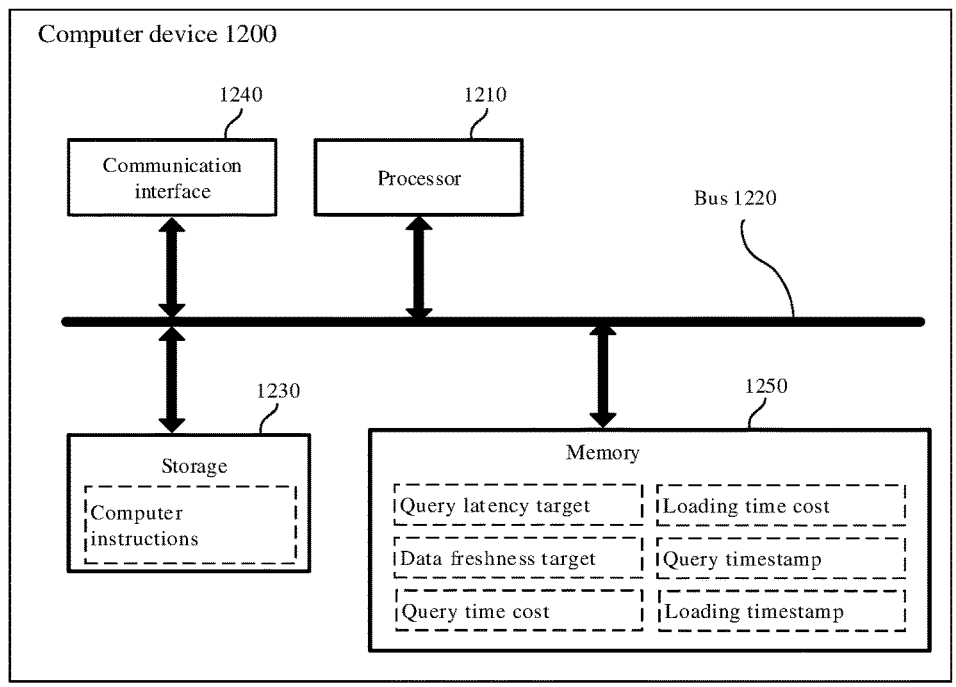
FIG. 12 is a schematic diagram illustrating a computer device in accordance with some embodiments of the present disclosure.

FIG. 12 is a schematic diagram illustrating a computer device in accordance with some embodiments of the present disclosure. As shown in FIG. 12, the computer device 1200 includes a processor 1210, a bus 1220, a storage 1230, a communication interface 1240, and a memory 1250 (which may also be called a main memory unit). The processor 1210, the storage 1230, the communication interface 1240 and the memory 1250 are connected through the bus 1220.

It will be understood that in this embodiment, the processor 1210 may be a CPU. The processor 1210 may also be other general-purpose processors, digital signal processing (DSP), ASIC, FPGA or other programmable logic devices, discrete gate or transistor logic devices, discrete hardware components, etc. A general-purpose processor may be a microprocessor or any conventional processor.

The computer device 1200 may also include a graphics processing unit (GPU), a neural network processing unit (NPU), a microprocessor, an ASIC, or one or more integrated circuits for controlling the execution of the program of the solution of the present disclosure.

The communication interface 1240 is used to realize communication between the computer device 1200 and external devices or components. In the embodiments of the present disclosure, when the computer device 1200 is used to implement the functions of the computer device shown in FIG. 2, the communication interface 1240 is used to obtain a query request so that the processor 1210 may execute the data query.

The bus 1220 may include a path for communicating information between the above-mentioned components (e.g., the processor 1210, the memory 1250, and the storage 1230). In addition to a data bus, the bus 1220 may also include a power bus, a control bus, and a status signal bus. However, for the sake of clarity, the various buses are collectively marked as "Bus 1220" in the figure. The bus 1220 may be a Peripheral Component Interconnect Express (PCIe) bus, an extended industry standard architecture (EISA) bus, a unified bus (Ubus or UB), a compute express link (CXL), or a cache coherent interconnect for accelerators (CCIX). The bus 1220 may be divided into an address bus, a data bus, a control bus, etc.

As an example, the computer device 1200 may include a plurality of processors. The processor may be a multi-core processor (multi-CPU). The processor herein may refer to one or more devices, circuits, or computing units for processing data (e.g., computer program instructions).

It will be noted that FIG. 12 only shows an example where the computer device 1200 includes one processor 1210 and one storage 1230. Herein, the processor 1210 and the storage 1230 are respectively used to indicate a type of component or device. In specific embodiments, the number of each type of component or device may be determined according to the needs of the service.

The memory 1250 may be either a volatile memory pool or a non-volatile memory pool, or may include both volatile memory and non-volatile memory. The non-volatile memory may be a read-only memory (ROM), a programmable ROM (PROM), an erasable programmable read-only memory (erasable PROM, EPROM), an electrically erasable read-only memory (electrically EPROM, EEPROM) or a flash memory. The volatile memory may be a random access memory (RAM), which acts as an external cache. By way of illustration, but not limitation, many forms of RAM are available, such as static random access memory (SRAM), dynamic random access memory (DRAM), synchronous dynamic random access memory (synchronous DRAM, SDRAM), double data rate synchronous dynamic random access memory (double data date SDRAM, DDR SDRAM), enhanced synchronous dynamic random access memory (enhanced SDRAM, ESDRAM), synchronous link dynamic random access memory (synchlink DRAM, SLDRAM) and direct rambus RAM (DR RAM). The memory 1250 is used to store the query latency target, the data freshness target, the query time cost, the loading time cost, the query timestamp, the loading timestamp, etc.

The storage 1230 may correspond to the storage medium used to store computer instructions in the above method embodiments. For example, the storage 1230 may be a magnetic disk, such as a mechanical hard disk or a solid state hard disk.

The computer device 1200 may be a general-purpose device or a special-purpose device. For example, the computer device 1200 may be an edge device (e.g., a box carrying a chip with processing power). In some embodiments, the computer device 1200 may also be a server or other device with computing capabilities.

It will be understood that the computer device 1200 according to this embodiment may correspond to the data query apparatus 1100 described above, and for the sake of brevity, details will not be repeated here.

The steps of the method in this embodiment may be implemented by hardware or by a processor executing software instructions. The software instructions may be composed of corresponding software modules. The software modules may be stored in a random access memory (RAM), a flash memory, a read-only memory (ROM), a programmable ROM (PROM), an erasable programmable read-only memory (erasable PROM, EPROM), an electrically erasable programmable read-only memory (electrically EPROM, EEPROM), a register, a hard disk, a mobile hard disk, a CD-ROM or any other form of storage media well-known in the art. An exemplary storage medium is coupled to the processor such that the processor can read information from the storage medium and write information to the storage medium. Of course, the storage medium may also be an integral part of the processor. The processor and the storage medium may be located in an ASIC. In addition, the ASIC may be located in a computing device. Of course, the processor and the storage medium may also exist as discrete components in a computing device.

The solution provided by the embodiments of the present disclosure may be applied to a client-server (C/S) architecture network. A client-server (C/S) architecture network may include a single server or a server cluster. The embodiments of this disclosure do not limit the type and function of the server. For example, the type of the server may include blade server, tower server, cabinet server, and rack server. For another example, the server includes a storage server with a storage function or a computing server with a computing function. The computing server may also have a storage function.

Figure 13:
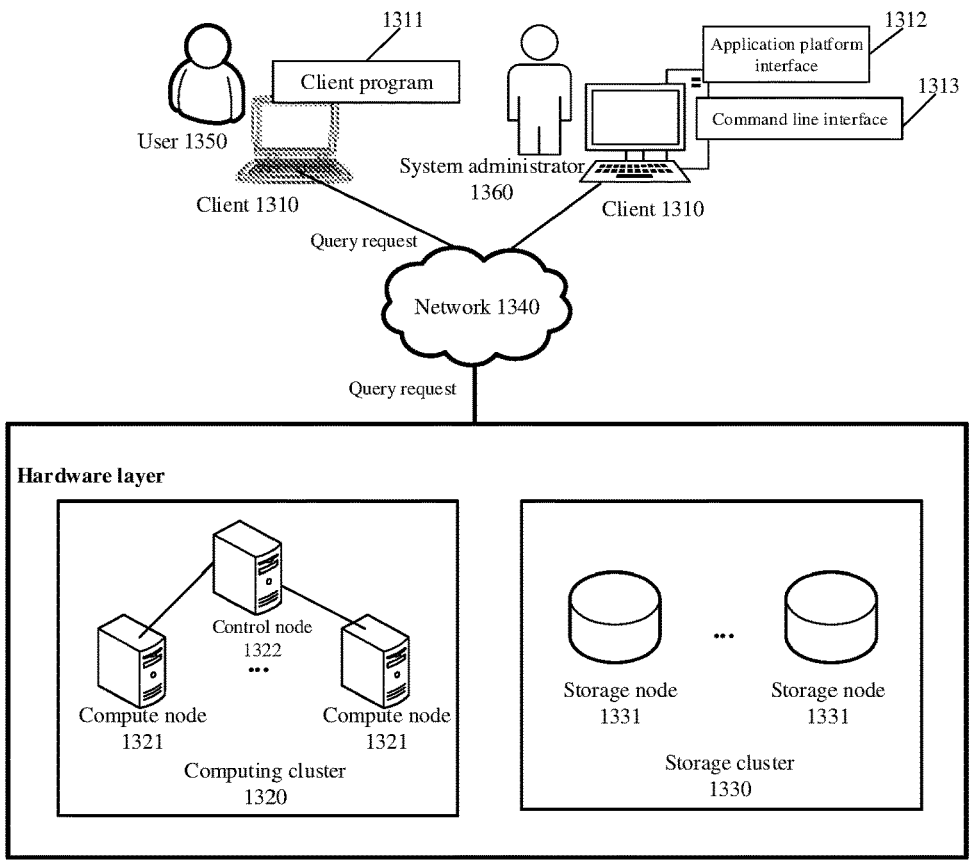
FIG. 13 is a schematic diagram illustrating a data processing system in accordance with some embodiments of the present disclosure.

For example, FIG. 13 is a schematic diagram illustrating a data processing system in accordance with some embodiments of the present disclosure. As shown in FIG. 13, the data processing system 1300 includes a client 1310, a computing cluster 1320 and a storage cluster 1330.

The storage cluster 1330 includes at least two storage nodes 1331. A storage node 1331 includes one or more controllers, network cards, and multiple hard disks. The hard disks are used to store data. The hard disk may be a magnetic disk or other type of storage medium, such as a solid state drive or a shingled magnetic recording hard drive. The network card is used to communicate with the compute nodes 1321 included in the computing cluster 1320. The controller is used to write data to the hard disk or read data from the hard disk according to the read/write data request sent by the compute node 1321. In the process of reading and writing data, the controller needs to convert the address carried in the read/write data request into an address that the hard disk can recognize.

The computing cluster 1320 includes at least two compute nodes 1321, and the compute nodes 1321 may communicate with each other. The compute node 1321 is a computing device, such as a server, a desktop computer, or a controller of a storage array.

The client 1310 communicates with the computing cluster 1320 and the storage cluster 1330 through the network 1340. For example, the client 1310 sends a service request for a big data service to the computing cluster 1320 through the network 1340, and requests that the computing cluster 1320 process the service request. The network 1340 may refer to an internal network (such as a Local Area Network (LAN)) of an enterprise, or the Internet. The client 1310 refers to a computer connected to the network 1340, and it may also be called a workstation. Different clients may share the resources on the network (such as computing resources, storage resources).

The big data service submitted by the client 1310 may be called a job. A job may be divided into multiple tasks, which are executed by multiple compute nodes in parallel. When all tasks are finished, a job is marked as completed. A task is generally a process of processing a portion of data in a job or a stage of the processing process of a job. All tasks are completed in parallel or serial through scheduling.

In some embodiments, the computing cluster 1320 includes a control node 1322. The control node and the compute nodes may be independent physical devices, and the control node may also be called a control device or a naming node. The compute node may be called a computing device or a data node. The control node 1322 is used to manage and allocate tasks, and multiple compute nodes execute multiple tasks in parallel to increase the data processing rate.

In the embodiments of the present disclosure, the storage cluster 1330 stores graph-structured data.

The computing cluster 1320 includes a heterogeneous computing architecture to provide high performance computing. For example, the compute node 1321 may include a central processing unit (CPU), a graphics processing unit (GPU), a data processing unit (DPU), a neural processing unit (NPU), and a neural-network processing unit (NPU) to provide high-performance computing.

The client 1310 is installed with a client program 1311. The client 1310 runs the client program 1311 to display a user interface (UI). The user 1350 operates the user interface to submit a data query request. The data query request may include a data identifier. After obtaining the data query request, the compute node 1321 obtains the data indicated by the data identifier from the storage cluster 1330.

In some embodiments, the compute node 1321 analyzes the query time cost and loading time cost of the already queried data, loads the data and the data relationship associated with the queried data in consideration of the data freshness target and the query latency target, and uses a graph structure to store the data and the data relationship from multiple data sources in the data destination. In this way, by adjusting the loading according to queries, the required data may be retrieved as quickly as possible when the data is queried, thereby reducing query latency and improving query efficiency.

In some embodiments, the system administrator 1360 may call the application platform interface (API) 1312 or the command line interface (CLI) interface 1313 through the client 1310 to configure system information, for example, the data freshness target and query latency target configured for the compute nodes in the embodiments of the present disclosure.

FIG. 13 is only a schematic diagram, and the embodiments of the present disclosure do not limit the connection manner of devices and the number of devices in the data processing system. For example, the data processing system may include multiple clients. One client may connect to multiple compute nodes, and different clients may connect to different compute nodes.

It will be noted that the data query function provided by the embodiments of the present disclosure may be implemented by a software system, a hardware device, or a combination of a software system and a hardware device.

In a possible implementation, the cloud service provider abstracts the data query function into a cloud service and deploys the cloud service in a cloud data center. Users may consult about and purchase the cloud service through the cloud service platform. After the user purchases the cloud service, he or she may submit a query request to the cloud data center through a terminal device, and the cloud data center runs the data query module to implement the data query function provided by the embodiments of the present disclosure.

In another possible implementation, the data query module may be packaged as a software package by the software provider. The user purchases the software package, and deploys the software package on his or her own server, or the user deploys the software package on a cloud server. For example, the data query module is deployed by a tenant in the computing resources (such as virtual machines) of the cloud data center rented by the tenant. The tenant purchases the computing resource cloud service provided by the cloud service provider through the cloud service platform, and runs the data query module in the purchased computing resources, so that the data query module executes the data query function provided by the embodiments of the present disclosure. Optionally, the data query module may also encrypt the data uploaded by the user and the file path of the data, so as to avoid direct contact with the data uploaded by the user without hampering the implementation effect and ensure information security.

The above embodiments may be implemented in whole or in part through software, hardware, firmware, or any combination thereof. When implemented through software, the above embodiments may be implemented in whole or in part in the form of a computer program product. The computer program product includes one or more computer programs or instructions. When the computer program(s) or instruction(s) are loaded on and executed by a computer, processes or functions provided in the embodiments of the present disclosure are executed in whole or in part. The computer may be a general-purpose computer, a dedicated computer, a computer network, a network device, or any other programmable device. The computer program(s) or instruction (s) may be stored in a computer-readable storage medium or transmitted from one computer-readable storage medium to another. For example, the computer program(s) or instruction(s) may be transmitted from a website, computer, server or data center to another website, computer, server, or data center via wired or wireless means. The computer-readable storage medium may be any available medium that can be accessed by the computer, or a data storage device such as a server or a data center that integrates one or more available media. The available medium may be a magnetic medium (e.g., a floppy disk, a hard disk or a magnetic tape), an optical medium (e.g., a digital versatile disk (DVD)), a semiconductor medium (e.g., a solid state drive (SSD)), or the like. The foregoing descriptions are merely specific implementation manners of the present disclosure, but the protection scope of the present disclosure is not limited thereto. Any person skilled in the art could readily conceive of equivalent changes or replacements within the technical scope of the present disclosure, which shall all be included in the protection scope of the present disclosure. Therefore, the protection scope of the present disclosure shall be subject to the protection scope of the claims.

The invention claimed is:

1. A method, comprising:
  receiving, by a computer device, a first query request from a client communicatively coupled to the computer device, the first query request including a first data identifier;
  sending back first data indicated by the first data identifier to the client;
  obtaining a query time cost of the first data, a loading time cost of the first data, a data freshness target, and a query latency target, wherein the query time cost of the first data indicates a first time interval of querying the first data from a data destination communicatively coupled to the computer device, and
wherein the loading time cost of the first data indicates a second time interval of loading the first data from a data source to the data destination;
determining a retrieving strategy based on the query time cost of the first data, the loading time cost of the first data, the data freshness target, and the query latency target;
retrieving, from the data destination, second data and a data relationship that are associated with the first data according to the retrieving strategy, wherein the second data and the data relationship meet the data freshness target, wherein the data relationship includes a relationship between the second data and the first data, wherein the first data and the second data are nodes in a graph structure of data, and wherein the data relationship between the first data and the second data is an edge in the graph structure of the data;
after the retrieving the second data and the data relationship, receiving a second query request from the client, the second query request including a second data identifier; and
sending back the second data indicated by the second data identifier to the client.

2. The method according to claim 1, wherein the retrieving the second data and the data relationship that are associated with the first data according to the retrieving strategy from the data destination includes:
returning the second data and the data relationship from the data destination, in a case where the data destination contains the second data and the data relationship.

3. The method according to claim 2, wherein the returning the second data and the data relationship from the data destination in a case where the data destination contains the second data and the data relationship includes:
in a case where the second data and the data relationship contained in the data destination meet data source freshness, returning the second data and the data relationship that meet the data source freshness from the data destination.

4. The method according to claim 2, wherein the returning the second data and the data relationship from the data destination in a case where the data destination contains the second data and the data relationship includes:
in a case where the second data and the data relationship contained in the data destination fail to meet data source freshness, loading the second data and the data relationship that meet the data source freshness from the data source to the data destination; and
returning the second data and the data relationship that meet the data source freshness from the data destination.

5. The method according to claim 1, wherein the retrieving the second data and the data relationship that are associated with the first data according to the retrieving strategy from the data destination includes:
loading the second data and the data relationship from the data source to the data destination and returning the second data and the data relationship from the data destination, in a case where the data destination fails to contain the second data and the data relationship.

6. The method according to claim 1, further comprising:
updating a query history in a case where the query history fails to include the second data and the data relationship, wherein the updated query history includes the second data and the data relationship.

7. The method according to claim 6, further comprising:
updating a first data query timestamp and a second data query timestamp in the query history, wherein in the updated query history, the first data query timestamp is a time when the first data is retrieved from the data destination, and the second data query timestamp is NULL.

8. The method according to claim 1, wherein the determining the retrieving strategy based on the query time cost of the first data, the loading time cost of the first data, the data freshness target, and the query latency target includes:
setting a sampling interval to the data freshness target in a case where the query time cost of the first data and the loading time cost of the first data meet the query latency target, wherein the sampling interval is a time interval of retrieving the second data and the data relationship from the data source.

9. The method according to claim 1, wherein the determining the retrieving strategy based on the query time cost of the first data, the loading time cost of the first data, the data freshness target, and the query latency target includes:
scaling a storage capacity of the data destination in a case where the query time cost of the first data fails to meet the query latency target.

10. The method according to claim 1, wherein the determining the retrieving strategy based on the query time cost of the first data, the loading time cost of the first data, the data freshness target, and the query latency target includes:
setting a sampling interval to a value of subtracting the query time cost of the first data from the data freshness target in a case where the query time cost of the first data fails to meet the query latency target, wherein the sampling interval is a time interval of retrieving the second data and the data relationship from the data source.

11. The method according to claim 1, wherein the determining the retrieving strategy based on the query time cost of the first data, the loading time cost of the first data, the data freshness target, and the query latency target includes:
scaling a number of loaders in a case where the query time cost of the first data and the loading time cost of the first data fail to meet the query latency target while the query time cost of the first data meets the query latency target.

12. The method according to claim 11, wherein the scaling the number of loaders includes:
deploying at least one additional loader and an original loader on a same server or on different servers.

13. The method according to claim 1, wherein the determining the retrieving strategy based on the query time cost of the first data, the loading time cost of the first data, the data freshness target, and the query latency target includes:
setting a sampling interval to a value of subtracting the loading time cost of the first data from the data freshness target in a case where the query time cost of the first data and the loading time cost of the first data fail to meet the query latency target while the query time cost of the first data meets the query latency target, wherein the sampling interval is a time interval of retrieving the second data and the data relationship from the data source.

14. The method according to claim 1, further comprising:
storing the second data and the data relationship in a cache communicatively coupled to the computer device, wherein:

the sending back the second data indicated by the second data identifier to the client includes: sending back the second data indicated by the second data identifier from the cache to the client.

15. The method according to claim 1, wherein a parameter of the first data or the second data includes at least one of:
the first data identifier for indicating the first data;
the second data identifier for indicating the second data;
query time cost, which is time it takes to query the first data or the second data from the data destination;
loading time cost, which is time it takes to load the first data or the second data from the data source to the data destination;
query timestamp, which is time that the first data or the second data is retrieved from the data destination;
loading timestamp, which is time that the first data or the second data is loaded from the data source to the data destination; or
data source freshness, which is a time interval of updating data at the data source.

16. The method according to claim 1, wherein the second data includes at least one data directly or indirectly associated with the first data.

17. A computer device, comprising:
a storage and at least one processor, wherein the storage is configured to store a set of computer instructions that, when the set of computer instructions are executed by the at least one processor, cause the computer device to perform operations comprising:
receiving a first query request from a client communicatively coupled to the computer device, the first query request including a first data identifier;
sending back first data indicated by the first data identifier to the client;
obtaining a query time cost of the first data, a loading time cost of the first data, a data freshness target, and a query latency target,
wherein the query time cost of the first data indicates a first time interval of querying the first data from a data destination communicatively coupled to the computer device, and
wherein the loading time cost of the first data indicates a second time interval of loading the first data from a data source to the data destination;
determining a retrieving strategy based on the query time cost of the first data, the loading time cost of the first data, the data freshness target, and the query latency target;
retrieving, from the data destination, second data and a data relationship that are associated with the first data according to the retrieving strategy, wherein the second data and the data relationship meet the data freshness target, wherein the data relationship includes a relationship between the second data and the first data, wherein the first data and the second data are nodes in a graph structure of data, and wherein the data relationship between the first data and the second data is an edge in the graph structure of the data;
after the retrieving the second data and the data relationship, receiving a second query request from the client, the second query request including a second data identifier; and
sending back the second data indicated by the second data identifier to the client.

18. A non-transitory computer-readable storage medium, storing instructions that, when executed by at least one processor of a computer device, cause the computer device to perform operations comprising:
receiving a first query request from a client communicatively coupled to the computer device, the first query request including a first data identifier;
sending back first data indicated by the first data identifier to the client;
obtaining a query time cost of the first data, a loading time cost of the first data, a data freshness target, and a query latency target,
wherein the query time cost of the first data indicates a first time interval of querying the first data from a data destination communicatively coupled to the computer device, and
wherein the loading time cost of the first data indicates a second time interval of loading the first data from a data source to the data destination;
determining a retrieving strategy based on the query time cost of the first data, the loading time cost of the first data, the data freshness target, and the query latency target;
retrieving, from the data destination, second data and a data relationship that are associated with the first data according to the retrieving strategy, wherein the second data and the data relationship meet the data freshness target, wherein the data relationship includes a relationship between the second data and the first data, wherein the first data and the second data are nodes in a graph structure of data, and wherein the data relationship between the first data and the second data is an edge in the graph structure of the data;
after the retrieving the second data and the data relationship, receiving a second query request from the client, the second query request including a second data identifier; and
sending back the second data indicated by the second data identifier to the client.

19. The computer device according to claim 17, wherein the retrieving the second data and the data relationship that are associated with the first data according to the retrieving strategy from the data destination includes:
returning the second data and the data relationship from the data destination, in a case where the data destination contains the second data and the data relationship.

20. The non-transitory computer-readable storage medium according to claim 18, wherein the retrieving the second data and the data relationship that are associated with the first data according to the retrieving strategy from the data destination includes:
returning the second data and the data relationship from the data destination, in a case where the data destination contains the second data and the data relationship.

* * * * *